US008507574B2

(12) United States Patent
Murouchi et al.

(10) Patent No.: US 8,507,574 B2
(45) Date of Patent: Aug. 13, 2013

(54) ZIRCONIUM OXIDE DISPERSION, PHOTO-CURING COMPOSITION CONTAINING ZIRCONIUM OXIDE PARTICLE, AND CURED FILM

(75) Inventors: Masato Murouchi, Otawara (JP); Kenji Hayashi, Otawara (JP); Daigou Mizoguchi, Otawara (JP); Masaaki Murakami, Otawara (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 617 days.

(21) Appl. No.: 12/516,652

(22) PCT Filed: Jun. 6, 2007

(86) PCT No.: PCT/JP2007/061475
§ 371 (c)(1),
(2), (4) Date: May 28, 2009

(87) PCT Pub. No.: WO2008/068915
PCT Pub. Date: Jun. 12, 2008

(65) Prior Publication Data
US 2010/0068482 A1   Mar. 18, 2010

(30) Foreign Application Priority Data
Dec. 1, 2006   (JP) .................................. 2006-325732

(51) Int. Cl.
*B29C 71/04* (2006.01)
*A61L 2/08* (2006.01)

(52) U.S. Cl.
USPC ............................................. 522/83; 522/79

(58) Field of Classification Search
USPC ...................................... 522/79, 83
See application file for complete search history.

(56) References Cited

U.S. PATENT DOCUMENTS

| 5,037,579 | A * | 8/1991 | Matchett ......................... 516/90 |
| 5,318,800 | A * | 6/1994 | Gong et al. ..................... 427/229 |
| 6,376,590 | B2 * | 4/2002 | Kolb et al. ...................... 524/413 |
| 6,387,981 | B1 * | 5/2002 | Zhang et al. .................... 523/117 |
| 6,846,568 | B2 * | 1/2005 | Yamaya et al. ................. 428/447 |
| 7,074,640 | B2 * | 7/2006 | Maloney et al. ................. 438/82 |
| 7,569,619 | B2 * | 8/2009 | Esaki et al. ...................... 522/79 |
| 7,641,837 | B2 * | 1/2010 | Takiyama et al. ............. 264/284 |
| 2004/0254282 | A1 | 12/2004 | Suzuki et al. |
| 2005/0004265 | A1 * | 1/2005 | Sapper ........................... 523/171 |
| 2005/0070623 | A1 | 3/2005 | Takase et al. |

FOREIGN PATENT DOCUMENTS

| JP | 2002-188014 | 7/2002 |
| JP | 2002-275396 | 9/2002 |
| JP | 2003-105034 | 4/2003 |
| JP | 2003-119207 | 4/2003 |
| JP | 2003-238893 | 8/2003 |
| JP | 2005-161111 | 6/2005 |
| JP | 2005-185924 | 7/2005 |
| JP | 2005-220264 | 8/2005 |
| JP | 2005-343119 | 12/2005 |
| JP | 2006-160600 | 6/2006 |

OTHER PUBLICATIONS

International Search Report—PCT/JP2007/061475—Sep. 11, 2007.
Extended European Search Report dated Sep. 6, 2012, with English translation; Application No. 07744818.1.

* cited by examiner

*Primary Examiner* — Ling Choi
*Assistant Examiner* — Jessica E Whiteley
(74) *Attorney, Agent, or Firm* — Young & Thompson

(57) ABSTRACT

The present invention provides a zirconium oxide dispersion which contains zirconium oxide particles, a metal complex, and a dispersion medium and which has excellent storage stability; a photo-curing composition containing zirconium oxide particles which contains zirconium oxide particles, a metal complex, an actinic energy ray-curing compound, a photopolymerization initiator, and a dispersion medium and which composition can form, on a surface of a substrate, a cured film having excellent transparency and high refractive index, and which composition does not corrode a metal-made apparatus employed in a dispersion process and a coating apparatus; and a cured film produced by applying onto a substrate the photo-curing composition containing zirconium oxide particles through coating or printing, followed by hardening.

11 Claims, No Drawings

ZIRCONIUM OXIDE DISPERSION, PHOTO-CURING COMPOSITION CONTAINING ZIRCONIUM OXIDE PARTICLE, AND CURED FILM

TECHNICAL FIELD

The present invention relates to a zirconium oxide dispersion having excellent storage stability, to a photo-curing composition containing zirconium oxide particles, and to a cured film produced from the composition. More particularly, the invention relates to a photo-curing composition which can form a cured film exhibiting excellent transparency and high refractive index on a surface of a substrate made of a material such as plastic, metal, wood, paper, glass, and slate, to a cured film produced from the composition and exhibiting excellent transparency and high refractive index, and to a zirconium oxide dispersion having excellent storage stability for use in preparation of such a photo-curing composition.

BACKGROUND ART

In recent years, for providing a protective coating material which prevents scratching and staining of substrates or a printing ink binder, there has been demand for a curing composition which has excellent coatability and which can provide, on surfaces of various substrates, a cured film being excellent in hardness, scratch resistance, wear resistance, low curling property, adhesion, transparency, resistance to chemicals, appearance, etc.

For producing an anti-reflection film of film-type liquid crystal displays, touch panels, plastic optical parts, etc., the demanded curing composition can form a cured film exhibiting, in addition to the aforementioned characteristics, excellent transparency and high refractive index.

In order to impart transparency, high refractive index, high hardness, and scratch resistance to a cured film produced from such a curing composition, a zirconium oxide dispersion is employed (see, for example, Patent Documents 1, 2, 3, and 4).

Patent Document 1: Japanese Patent Application Laid-Open (kokai) No. 2003-105034
Patent Document 2: Japanese Patent Application Laid-Open (kokai) No. 2005-161111
Patent Document 3: Japanese Patent Application Laid-Open (kokai) No. 2005-185924
Patent Document 4: Japanese Patent Application Laid-Open (kokai) No. 2005-220264

DISCLOSURE OF THE INVENTION

Problems to be Solved by the Invention

The zirconium oxide dispersions for the aforementioned applications must have a small particle size of zirconium oxide particles and excellent storage stability. When such a dispersion is employed for forming an anti-reflection film or the like, the dispersion must provide a low haze of a formed film so as to attain high total light transmittance, and high refractive index. Acetylacetone employed as a dispersing aid in the technique disclosed in Patent Documents 2, 3, and 4, forms a metal chelate, which problematically corrodes a metal-made apparatus employed in a dispersion process and a coating apparatus. Patent Documents 2, 3, and 4 also disclose a requirement for addition of a dispersant for producing a dispersion. However, generally, addition of a dispersant reduces characteristics of coating film such as film strength and scratch resistance, and also increases the number of production steps, possibly elevating production cost.

The present invention has been accomplished to solve the aforementioned problems, and objects of the invention are to provide (1) a zirconium oxide dispersion which has excellent storage stability, (2) a photo-curing composition which can form, on a surface of a substrate, a cured film having excellent transparency and high refractive index, and which does not corrode a metal-made apparatus employed in a dispersion process and a coating apparatus, and (3) a cured film produced from the composition, the film exhibiting excellent transparency and high refractive index.

Means for Solving the Problems

In order to attain the aforementioned objects, the present inventors have carried out extensive studies, and have found that the target effect can be attained by dispersing zirconium oxide particles and a metal complex in a dispersion medium and by employing such a dispersion. The present invention has been accomplished on the basis of this finding.

Accordingly, the present invention provides a zirconium oxide dispersion characterized by comprising zirconium oxide particles, a metal complex, and a dispersion medium. Preferably, the dispersion comprises 100 parts by mass of zirconium oxide particles, 2 to 45 parts by mass of a metal complex, and 40 to 1,000 parts by mass of a dispersion medium.

The present invention also provides a photo-curing composition containing zirconium oxide particles, characterized in that the composition comprises zirconium oxide particles, a metal complex, an actinic energy ray-curing compound, a photopolymerization initiator, and a dispersion medium. Preferably, the composition comprises 100 parts by mass of zirconium oxide particles, 2 to 45 arts by mass of a metal complex, 40 to 1,000 parts by mass of a dispersion medium, and 10 to 1,000 parts by mass of an actinic energy ray-curing compound, wherein the photopolymerization initiator content is 0.1 to 20 parts by mass with respect to 100 parts by mass of the actinic energy ray-curing compound.

The present invention also provides a cured film, characterized by being produced by applying onto a substrate the aforementioned photo-curing composition containing zirconium oxide particles through coating or printing and curing the composition. Preferably, the cured film exhibits a refractive index of 1.45 to 1.90, a light transmittance of 85% or higher, and a haze of 1.0% or less.

EFFECTS OF THE INVENTION

According to the present invention, there can be provided (1) a zirconium oxide dispersion which has excellent storage stability; (2) a photo-curing composition which can form, on a surface of a substrate, a cured film having excellent transparency and high refractive index, and which does not corrode a metal-made apparatus employed in a dispersion process and a coating apparatus; and (3) a cured film produced from the composition, the film exhibiting excellent transparency and high refractive index.

BEST MODES FOR CARRYING OUT THE INVENTION

Specific embodiments of the present invention will next be described.

The zirconium oxide dispersion of the present invention contains zirconium oxide particles, a metal complex, and a dispersion medium. No particular limitation is imposed on the shape of the zirconium oxide particles employed in the present invention. The zirconium oxide particles which can be employed in the invention generally have a primary particle size of 1 nm to 100 nm, preferably 5 to 40 nm.

Examples of the metal complex employed in the present invention include metal complexes formed of a metal and a ligand, wherein the metal is selected from the group consisting of zirconium, titanium, chromium, manganese, iron, cobalt, nickel, copper, vanadium, aluminum, zinc, indium, tin, and platinum, preferably the metal is selected from the group consisting of zirconium, titanium, aluminum, zinc, indium, and tin, from the viewpoint of small coloring degree of the dispersion and the ligand is selected from the group consisting of β-ketones, preferably the ligand is selected from the group consisting of pivaloyltrifluoroacetone, acetylacetone, trifluoroacetylacetone, and hexafluoroacetylacetone.

In the present invention, the metal complex serves as a dispersant, whereby a zirconium oxide dispersion having excellent storage stability can be produced. In addition, the metal complex virtually gives no corrosion to a metal-made apparatus employed in a dispersion process and to a coating apparatus.

For the purpose of further enhancing the storage stability of dispersion, other additional dispersing aids may be added thereto. No particular limitation is imposed on such dispersing aids, and examples preferred dispersing aids include phosphate ester-type nonionic dispersants having a polyoxyethylene alkyl structure.

Examples of the dispersion medium employed in the present invention include water, alcohols such as methanol, ethanol, isopropanol, n-butanol, 2-butanol, and octanol; ketones such as acetone, methyl ethyl ketone, methyl isobutyl ketone, cyclohexanone, and 4-hydroxy-4-methyl-2-pentanone; esters such as ethyl acetate, butyl acetate, ethyl lactate, γ-butyrolactone, propylene glycol monomethyl ether acetate, and propylene glycol monoethyl ether acetate; ethers such as ethylene glycol monomethyl ether and diethylene glycol monobutyl ether; aromatic hydrocarbons such as benzene, toluene, xylene, and ethylbenzene; and amides such as dimethylformamide, N,N-dimethylacetamide, and N-methylpyrrolidone. Of these, ethanol, isopropanol, n-butanol, 2-butanol, methyl ethyl ketone, methyl isobutyl ketone, cyclohexanone, 4-hydroxy-4-methyl-2-pentanone, ethyl acetate, butyl acetate, toluene, xylene, and ethylbenzene are preferred, with methyl ethyl ketone, butanol, xylene, ethylbenzene, and toluene being more preferred. In the present invention, these dispersion media may be used singly or in combination of two or more species.

In the zirconium oxide dispersion of the present invention, the amount of each ingredient may be appropriately adjusted in accordance with the purpose of use of the zirconium oxide dispersion. Preferably, with respect to 100 parts by mass of zirconium oxide particles, the metal complex content is preferably 2 to 45 parts by mass, more preferably 5 to 20 parts by mass, and the dispersion medium content is preferably 40 to 1,000 parts by mass, more preferably 60 to 600 parts by mass. When the amount of metal complex is less than the lower limit, dispersion of zirconium oxide particles is insufficient, whereas when the amount is in excess of the upper limit, the metal complex may fail to be dissolved in the dispersion medium, and precipitation occurs in some cases. When the amount of dispersion medium is lower than the lower limit, dissolution of metal complex and dispersion of zirconium oxide particles are insufficient, whereas when the amount is in excess of the upper limit, the zirconium oxide dispersion has excessively low concentration, which is not preferred in practical use.

The zirconium oxide dispersion of the present invention is produced through adding, in an arbitrary sequence, of zirconium oxide particles, a metal complex, and a dispersion medium, and sufficiently mixing the resultant mixture. In a typical procedure, zirconium oxide particles are dispersed in a dispersion medium in which a metal complex has been dissolved. Before performing a dispersing process, a preliminary dispersing process is preferably performed. In the preliminary dispersing process, zirconium oxide particles are gradually added to a dispersion medium in which a metal complex has been dissolved by means of a disper or a similar apparatus, and the mixture is sufficiently stirred until disappearance of mass of zirconium oxide is visually confirmed.

The dispersion process of zirconium oxide particles may be performed by means of, for example, a paint shaker, a ball mill, a sand mill, or a centri-mill. During the dispersing process, beads for dispersion such as glass beads and zirconia beads are preferably used. No particular limitation is imposed on the bead size, and the size is generally about 0.05 to about 1 mm, preferably 0.05 to 0.65 mm, more preferably 0.08 to 0.65 mm, particularly preferably 0.08 to 0.5 mm.

In the zirconium oxide dispersion of the present invention, the particle size (as a median size) of zirconium oxide particles is preferably 120 nm or less, more preferably 80 nm or less. When the median size is more than the upper limit, the haze of a cured film produced from the photo-curing composition containing zirconium oxide particles tends to increase.

In the zirconium oxide dispersion of the present invention, zirconium oxide particles are dispersed in a stable manner for a long period of time. In addition, since the zirconium oxide dispersion contains no substance that corrodes metal (e.g., acetylacetone), the dispersion can be stored in a metallic container.

The zirconium oxide dispersion of the present invention may be incorporated into a composition for forming protective film, a composition for forming anti-reflection film, an adhesive, a sealing material, a binder, etc. Particularly preferably, the zirconium oxide dispersion is employed in a composition for forming an anti-reflection film having high-refractive index.

The photo-curing composition of the present invention containing zirconium oxide particles comprises zirconium oxide particles, a metal complex, an actinic energy ray-curing compound, a photopolymerization initiator, and a dispersion medium. The characteristics of the zirconium oxide particles, metal complex, and dispersion medium are the same as described above.

Examples of the actinic energy ray-curing compound employed in the present invention include radical-polymerizable monomers and radical-polymerizable oligomers.

Specific examples of radical-polymerizable monomers include monofunctional (meth)acrylates such as methyl (meth)acrylate, ethyl (meth)acrylate, isopropyl (meth)acrylate, 2-ethylhexyl (meth)acrylate, butyl (meth)acrylate, cyclohexyl (meth)acrylate, tetrahydrofurfuryl (meth)acrylate, 2-hydroxyethyl (meth)acrylate, 2-hydroxypropyl (meth)acrylate, polyethylene glycol mono(meth)acrylate, methoxypolyethylene glycol mono(meth)acrylate, polypropylene glycol mono(meth)acrylate, polyethylene glycol polypropylene glycol mono(meth)acrylate, polyethylene glycol polytetramethylene glycol mono(meth)acrylate, and glycidyl (meth)acrylate; bifunctional (meth)acrylates such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, neopentyl glycol di(meth)acrylate, allyl di(meth)acrylate, bisphenol A di(meth)acrylate, ethylene oxide-modified bisphenol A di(meth)acrylate, polyethylene oxide-modified bisphenol A di(meth)acrylate, ethylene oxide-modified bisphenol S di(meth)acrylate, bisphenol S di(meth)acrylate, 1,4-butanediol di(meth)acrylate, and 1,3-butylene glycol di(meth)acrylate; three or more functional (meth)acrylates such as trimethylolpropane tri(meth)acrylate, glycerol tri(meth)acrylate, pentaerythritol tri(meth)acrylate, pentaerythritol tetra(meth)acrylate, ethylene oxide-modified trimethylolpropane tri(meth)acrylate, dipentaerythritol penta(meth)acrylate, and dipentaerythritol hexa (meth)acrylate; and radical-polymerizable monomers such as styrene, vinyltoluene, vinyl acetate, N-vinylpyrrolidone, acrylonitrile, and allyl alcohol.

Specific examples of radical-polymerizable oligomers include prepolymers having at least one (meth)acryloyl group such as polyester (meth)acrylate, polyurethane (meth)acrylate, epoxy (meth)acrylate, polyether (meth)acrylate, oligo (meth)acrylate, alkyd (meth)acrylate, polyol (meth)acrylate, and silicone (meth)acrylate. Of these, polyester (meth)acrylates, epoxy (meth)acrylates, and polyurethane (meth)acrylates are particularly preferred as radical-polymerizable oligomers. In the present invention, these actinic energy ray-curing compounds may be used singly or in combination of two or more species.

The photo-curing composition containing zirconium oxide particles of the present invention contains photopolymerization initiator (photo-sensitizer). Therefore, the photo-curing composition containing zirconium oxide particles can be cured by a small dose of actinic energy ray radiation.

Examples of the photopolymerization initiator (photo-sensitizer) employed in the present invention include 1-hydroxycyclohexyl phenyl ketone, benzophenone, benzyl dimethyl ketone, benzoin methyl ether, benzoin ethyl ether, p-chlorobenzophenone, 4-benzoyl-4-methyldiphenyl sulfide, 2-benzyl-2-dimethylamino-1-(4-morpholinophenyl)-butanone-1, and 2-methyl-1-[4-(methylthio)phenyl]-2-morpholinopropanone-1. These photopolymerization initiators may be used singly or in combination of two or more species.

In the photo-curing composition containing zirconium oxide particles of the present invention, the amount of each ingredient may be appropriately adjusted in accordance with the purpose of use of the photo-curing composition containing zirconium oxide particles. Preferably, with respect to 100 parts by mass of zirconium oxide particles, the metal complex content 2 to 45 parts by mass (more preferably 5 to 20 parts by mass), the dispersion medium content is 40 to 1,000 parts by mass (more preferably 60 to 600 parts by mass), and the actinic energy ray-curing compound content is 10 to 1,000 parts by mass (more preferably 25 to 150 parts by mass). The photopolymerization initiator content is preferably 0.1 to 20 parts by mass (more preferably 1 to 15 parts by mass), with respect to 100 parts by mass of an actinic energy ray-curing compound.

When the amount of metal complex is less than the lower limit, dispersion of zirconium oxide particles tends to be insufficient, whereas when the amount is in excess of the upper limit, the metal complex may fail to be dissolved in the dispersion medium, and precipitation occurs in some cases. When the amount of dispersion medium is lower than the lower limit, dissolution of metal complex and dispersion of zirconium oxide particles tend to be insufficient, whereas when the amount is in excess of the upper limit, the zirconium oxide dispersion has excessively low concentration, and the effect of added zirconium oxide particles tends to be insufficient. When the amount of actinic energy ray-curing compound is lower than the lower limit, the refractive index of the formed cured film tends to increase, but the transparency of the film tends to decrease. When the amount is in excess of the upper limit, the refractive index of the cured film cannot be elevated to a desired level. When the amount of photopolymerization initiator is lower than the lower limit, the hardening speed of the photo-curing composition tends to decrease, whereas when the amount is adjusted to exceed the upper limit, the effect commensurate the amount cannot be attained.

So long as the objects of the invention are not impeded, the photo-curing composition of the present invention may further contain ordinary additives other than the aforementioned additives. Examples of such additives include a polymerization inhibitor, a hardening catalyst, an anti-oxidant, a leveling agent, and a coupling agent.

The photo-curing composition of the present invention can provide a film through applying or printing the composition onto a substrate, followed by hardening. Examples of the material of the substrate include plastics (polycarbonate, poly (methyl methacrylate), polystyrene, polyester, polyolefin, epoxy resin, melamine resin, triacetyl cellulose resin, poly (ethylene terephthalate) ABS resin, AS resin, and norbornene resin), metal, wood, paper, glass, and slate. For example, the composition of the present invention may be used as a protective coating material for preventing scratching and staining of plastic optical parts, touch panels, film-type liquid crystal displays, plastic containers, inner building materials (e.g., floor material, wall material, and artificial marble); as an anti-reflection film for film-type liquid crystal displays, touch panels, and plastic optical parts; and as an adhesive and sealing material for various substrates; and as a binder for ink. Particularly, the composition can be preferably employed as a composition for forming a high-refractive-index film serving as an anti-reflection film.

Applying or printing of the photo-curing composition onto a substrate may be performed through a routine technique such as roller-coating, spin-coating, or screen printing. If required, the dispersion medium (solvent) is evaporated by heating, to thereby dry the formed coating film. Subsequently, the film is irradiated with an actinic energy ray (a UV ray or an electron beam). Examples of the source of the actinic energy ray which may be employed in the invention include UV sources such as a low-pressure mercury lamp, a high-pressure mercury lamp, a metal halide lamp, a xenon lamp, an excimer laser, and a dye laser, and an electron-beam-accelerator. The suitable dose of the actinic energy ray is 50 to 3,000 mJ/cm$^2$ (in the case of UV rays) and 0.2 to 1,000 µC/cm$^2$ (in the case of electron beam). Through irradiation of the film with an actinic energy ray, the aforementioned actinic energy ray-curing compound polymerizes, to thereby form a film in which zirconium oxide particles are bound with the resin. Generally, the thickness of the film is preferably 0.1 to 10.0 µm.

The cured film of the present invention produced through curing the photo-curing composition prepared from the zirconium oxide dispersion of the present invention contains zirconium oxide particles uniformly dispersed in the cured film. Therefore, refractive index can be controlled, and high refractive index, high transparency, and low haze can be attained. Specifically, a refractive index of 1.45 to 1.90, a light transmittance of 85% or higher, and a haze of 1.0% or lower can be attained. In order to control the refractive index, the ratio in amount of zirconium oxide particles to actinic energy ray-curing compound may be adjusted. A cured film having high refractive index may be employed as a display surface film.

EXAMPLES

The present invention will next be described in more detail by way of Examples and Comparative Examples. In the Examples and Comparative Examples, the unit "part(s)" refers "parts by mass."

The following components were employed in the Examples and the Comparative Examples.

<Zirconium Oxide Particles>

UEP-100 (primary particle size: 10 to 30 nm, product of Daiichi Kigenso Kagaku Kogyo K.K.)

<Metal Complex>

Zirconium acetylacetonate ($[Zr(C_5H_7O_2)_4]$) (product of Kanto Chemical Co., Inc)

Orgatix TC-401 ($[Ti(C_5H_7O_2)_4]$) (product of Matsumoto Seiyaky Kogyo K.K.)

Nacem Aluminum ($[Al(C_5H_7O_2)_3]$) (product of Nihon Kagaku Sangyo Co., Ltd.)

Nacem Zinc ($[Zn(C_5H_7O_2)_2] \cdot H_2O$) (product of Nihon Kagaku Sangyo Co., Ltd.)

Nacem Indium ($[In(C_5H_7O_2)_3]$) (product of Nihon Kagaku Sangyo Co., Ltd.)

Nacem Tin ($[(C_4H_9)Sn((C_5H_7O_2)_2]$) (product of Nihon Kagaku Sangyo Co., Ltd.)

<Dispersing Aid>

BYK-142 (NV, 60%) (product of BYK Chemie Japan K.K.)

<Actinic Energy Ray-Curing Compound (Polyfunctional (Meth)Acrylate Monomer)>

KAYARAD DPHA (a mixture of dipentaerythritol hexaacrylate and dipentaerythritol pentaacrylate (60:40 by mass) (product of Nippon Kayaku Co., Ltd.)<

<Photopolymerization Initiator>

IRGACURE 184 (product of Ciba Specialty Chemicals)

<Chelating Agent>

Acetylacetone (Product of Daicel Chem. Ind., Ltd.)

Example 1

Zirconium oxide particles (100 parts), zirconium acetylacetonate (12 parts), 2-butanol (180 parts), and glass beads (800 parts) were all placed in a vessel, and the mixture was kneaded by means of a paint shaker for 7 hours. After kneading, the glass beads were removed from the reaction mixture, to thereby recover a zirconium oxide dispersion. To the dispersion, DPHA (33 parts), IRGACURE 184 (3.3 parts), and 2-butanol (55 parts) were added, to thereby prepare a photo-curing composition. The photo-curing composition was applied to a PET film having a thickness of 75 μm (Toyobo A4300, light transmittance: 91%, haze: 0.5%) by means of a roller-coater, and the organic solvent was evaporated. Subsequently, the coating was irradiated in air with light from a high-pressure mercury lamp at a dose of 300 mJ/cm², to thereby form a cured film having a thickness of 3 μm.

Example 2

Zirconium oxide particles (100 parts), zirconium acetylacetonate (12 parts) BYK-142 (8.3 parts), 2-butanol (180 parts), and glass beads (800 parts) were all placed in a vessel, and the mixture was kneaded by means of a paint shaker for 7 hours. After kneading, the glass beads were removed from the reaction mixture, to thereby recover a zirconia dispersion. To the dispersion, DPHA (28 parts), IRGACURE 184 (2.8 parts), and 2-butanol (55 parts) were added, to thereby prepare a photo-curing composition. Subsequently, in a manner similar to that employed in Example 1, a cured film having a thickness of 3 μm was produced.

Example 3

The same procedure of Example 1 was repeated, except that Orgatix TC-401 (11 parts) was used instead of zirconium acetylacetonate (12 parts), to thereby produce a cured film having a thickness of 3 μm.

Example 4

The same procedure of Example 1 was repeated, except that Nacem Aluminum (11 parts) was used instead of zirconium acetylacetonate (12 parts), to thereby produce a cured film having a thickness of 3 μm.

Example 5

The same procedure of Example 1 was repeated, except that Nacem Zinc (14 parts) was used instead of zirconium acetylacetonate (12 parts), to thereby produce a cured film having a thickness of 3 μm.

Example 6

The same procedure of Example 1 was repeated, except that Nacem Indium (14 parts) was used instead of zirconium acetylacetonate (12 parts), to thereby produce a cured film having a thickness of 3 μm.

Example 7

The same procedure of Example 1 was repeated, except that Nacem Tin (22 parts) was used instead of zirconium acetylacetonate (12 parts), to thereby produce a cured film having a thickness of 3 μm.

Comparative Example 1

Zirconium oxide particles (100 parts), BYK-142 (8.3 parts), 2-butanol (180 parts), and glass beads (800 parts) were all placed in a vessel, and the mixture was kneaded by means of a paint shaker for 7 hours. During kneading, the viscosity of the dispersion increased.

Comparative Example 2

The same procedure of Example 2 was repeated, except that acetylacetone (10 parts) was used instead of zirconium acetylacetonate (12 parts), to thereby produce a cured film having a thickness of 3 μm.

<Method of Evaluation>

(1) Median Diameter of Zirconium Oxide Particles

Each of the zirconium oxide dispersion produced in the Examples and Comparative Examples were subjected to measurement of the median diameter of zirconium oxide particles dispersed in the dispersion. The measurement was performed under the following conditions, immediately after production of the dispersion, 3 months after storage (at 40° C.), 6 months after storage (at 40° C.), and 1 year after storage (at 40° C.). Table 1 shows the results.

Apparatus: Microtrac particle size distribution meter (product of Nikkiso Co., Ltd,)

Measurement conditions: temperature of 20° C.

Sample: Not modified before measurement

Data analysis conditions: particle size based:volume based
Refractive index of dispersed $ZrO_2$: 2.050
Refractive index of 2-butanol as a dispersion medium: 1.40

(2) Transmittance and Haze of Cured Film

The transmittance and haze of each of the cured films produced in the Examples and Comparative Examples were determined by means of TC-HIII DPK (product of Tokyo Denshoku Co., Ltd.). The values were obtained from the film attached to a substrate.

(3) Refractive Index

The refractive index of each of the cured films produced in the Examples and Comparative Examples was determined at 20° C. by means of an Abbe refractometer DR-M4 (product of Aatago Co., Ltd.).

(4) Corrosion of Metallic Container

Each of the zirconium oxide dispersions produced in the Examples and Comparative Examples was placed in a stainless steel container (made of SUS304; Fe—Cr—Ni stainless steel) and stored for one month. After storage, the corrosion state of the stainless steel container was visually evaluated. The results are shown in Table 1.

TABLE 1

|  |  | Examples |  |  |  |  |  |  | Comp. Exs. |  |
|---|---|---|---|---|---|---|---|---|---|---|
|  |  | 1 | 2 | 3 | 4 | 5 | 6 | 7 | 1 | 2 |
| Dispersing aid |  | nil | use | nil | nil | nil | nil | nil | use | use |
| Metal complex in dispersion (mass %) |  | 4.1 | 4.0 | 3.8 | 3.8 | 4.8 | 4.8 | 7.3 | — | — |
| Acetylacetone in dispersion (mass %) |  | — | — | — | — | — | — | — | — | 3.4 |
| Median diam. (nm) | initial | 18 | 20 | 25 | 26 | 28 | 30 | 25 | — | 25 |
|  | 3 months | 20 | 18 | 29 | 24 | 24 | 21 | 21 | — | 23 |
|  | 6 months | 30 | 33 | 21 | 22 | 21 | 25 | 30 | — | 32 |
|  | 1 year | 25 | 27 | 28 | 31 | 27 | 32 | 33 | — | 29 |
| Transmittance (%) |  | 87.0 | 87.0 | 86.8 | 87.1 | 87.0 | 87.0 | 86.6 | — | 87.0 |
| Haze (%) |  | 0.6 | 0.6 | 0.7 | 0.6 | 0.6 | 0.7 | 0.8 | — | 0.5 |
| Refractive index |  | 1.70 | 1.70 | 1.71 | 1.70 | 1.69 | 1.69 | 1.68 | — | 1.70 |
| Corrosion of metallic container |  | nil | nil | nil | nil | nil | nil | nil | nil | occurred |

As is clear from Table 1, the dispersions containing a metal complex (Examples 1 to 7) exhibit excellent storage stability in the presence or absence of a dispersing aid, and give no corrosion to a metallic container employed in storage. The cured films produced through applying photo-curing compositions employing the zirconium oxide dispersions produced in Examples 1 to 7 exhibit a refractive index of 1.68 to 1.71, a transmittance of 85% or higher, and a haze of 1.0% or less; i.e., exhibit high refractive index and excellent transparency. In the case where no metal complex is added to a dispersion (Comparative Example 1), dispersion of components was difficult, resulting in failure to obtain a uniform dispersion. In the case where acetylacetone was added to a zirconium oxide dispersion (Comparative Example 2), the resultant dispersion gave considerable corrosion to a metallic container in which the dispersion had been stored.

The invention claimed is:

1. A photo-curing composition, consisting of:
   zirconium oxide particles,
   a metal-ketone complex,
   an actinic energy ray-curing compound,
   a photopolymerization initiator, and
   a dispersion medium,
wherein the metal-ketone complex is selected from the group consisting of:
   zirconium acetylacetonate ($Zr(C_5H_7O_2)_4$); titanium acetylacetonate $Ti(C_5H_7O_2)_4$; zinc acetylacetonate ($Zn(C_5H_7O_2)_2$); indium acetylacetonate ($In(C_5H_7O_2)_3$); and tin acetylacetonate $Sn(C_4H_9)_2(C_5H_7O_2)_2$.

2. The photo-curing composition according to claim 1, wherein, with respect to 100 parts by mass of zirconium oxide particles, has a metal complex content of 2 to 45 parts by mass, a dispersion medium content of 40 to 1,000 parts by mass, and an actinic energy ray-curing compound content of 10 to 1,000 parts by mass, and the photopolymerization initiator content is 0.1 to 20 parts by mass with respect to 100 parts by mass of the actinic energy ray-curing compound.

3. The photo-curing composition according to claim 1, wherein the metal-ketone complex is formed of:
   a metal selected from the group consisting of zirconium, titanium, zinc, indium, and tin, and
   a ligand selected from the group consisting of pivaloyltrifluoroacetone, acetylacetone, trifluoroacetylacetone, and hexafluoroacetylacetone.

4. The photo-curing composition according to claim 2, wherein the metal-ketone complex is formed of:
   a metal selected from the group consisting of zirconium, titanium, zinc, indium, and tin, and
   a ligand selected from the group consisting of pivaloyltrifluoroacetone, acetylacetone, trifluoroacetylacetone, and hexafluoroacetylacetone.

5. The photo-curing composition according to claim 1, wherein the dispersion medium comprises ethanol, isopropanol, n-butanol, 2-butanol, methyl ethyl ketone, methyl isobutyl ketone, cyclohexanone, 4-hydroxy-4-methyl-2-pentanone, ethyl acetate, butyl acetate, toluene, xylene, ethylbenzene, or mixtures thereof.

6. The photo-curing composition according to claim 2, having a metal complex content of 5 to 20 parts by mass.

7. The photo-curing composition according to claim 2, having a dispersion medium content of 60 to 600 parts by mass.

8. The photo-curing composition according to claim 1, wherein the zirconium oxide particles have a median particle of 120 nm or less.

9. The photo-curing composition according to claim 1, wherein the zirconium oxide particles have a median particle of 80 nm or less.

10. The photo-curing composition according to claim 2, having a metal complex content of 5 to 20 parts by mass.

11. The photo-curing composition according to claim 2, having an actinic energy ray-curing compound content of 25 to 150 parts by mass.

\* \* \* \* \*